United States Patent
Gibbons et al.

(12)

(10) Patent No.: US 6,177,512 B1
(45) Date of Patent: Jan. 23, 2001

(54) HIGH IMPACT POLYSTYRENE CONTAINING POLYPHENYLENE OXIDE

(75) Inventors: Loren K. Gibbons, Pointe aux Pins, MI (US); Chen-Youn Sue, Williamstown, WV (US); Jeffrey Silloway, Marietta, OH (US); Jason J. Miller, Cutler, OH (US); Michael J. Hanner, Marietta, OH (US); Seldon L. Dotson, Parkersburg, WV (US)

(73) Assignee: Chevron Chemical Company LLC, San Francisco, CA (US)

( * ) Notice: Under 35 U.S.C. 154(b), the term of this patent shall be extended for 0 days.

(21) Appl. No.: 09/365,434

(22) Filed: Aug. 2, 1999

(51) Int. Cl.[7] .......................... C08F 279/02; C08L 51/04; C08L 55/02
(52) U.S. Cl. .............................. 525/53; 525/68; 525/132; 525/149
(58) Field of Search ................................ 525/53, 68, 132, 525/149

(56) References Cited

U.S. PATENT DOCUMENTS 3,664,977 * 5/1972 Nakanishi ............................. 525/132
5,660,776 * 8/1997 Wooden ................................ 264/143

* cited by examiner

*Primary Examiner*—Patricia A. Short
(74) *Attorney, Agent, or Firm*—Thomas G. DeJonghe

(57) ABSTRACT

In the present invention, a process is provided for producing high impact polystyrene of improved heat resistance. According to the invention, after phase inversion of the rubber-polystyrene system, a slurry of PPE in styrene is added in situ to the process. The PPE slurry in styrene contains greater than 15 wt. % of PPE and is introduced to the process at point past rubber phase inversion, preferably at point where total polymer solids is greater than 40 wt. % of the total weight of the polymerization mixture. Preferably, four continuous stirred tank reactors in series are used in the process and preferably the slurry of PPE in styrene monomer is introduced to the third CSTR.

9 Claims, 1 Drawing Sheet

HIGH IMPACT POLYSTYRENE CONTAINING POLYPHENYLENE OXIDE

FIELD OF THE INVENTION

The present invention relates to a polymerization process for producing polystyrene having, compared to conventional high impact polystyrene, improved properties, such as heat resistance, impact strength at low temperature, environmental stress crack resistance and colorability. More particularly, the present invention relates to a bulk process for producing engineering polystyrene resins containing rubber components, such as butadiene rubber, and also containing polyphenylene ether.

BACKGROUND OF THE INVENTION

Polystyrene is a high molecular weight linear polymer produced by polymerizing styrene. When made from only the styrene monomer, the resulting polymer has a glass transition temperature of about 100° C. and is brittle, showing very poor strength (impact strength, elongation to rupture and dart-drop impact strength) characteristics. The strength characteristics can be improved by incorporating rubber modifiers, such as butadiene rubber. When a rubber is incorporated, the product is called "HIPS" for High Impact Polystyrene.

HIPS usually contains about 5 to 15 wt. % polybutadiene or styrene-butadiene copolymer rubber. However, the presence of polystyrene occlusions within the rubber phase typically results in about 10–40% volume fraction of the reinforcing rubber phase. When polymerizing styrene in the presence of polybutadiene, polybutadiene grafts with polystyrene. There is a phase inversion period as the polymerization progresses. The polybutadiene-styrene phase is the continuous phase during the earlier part of the polymerization, with polystyrene dispersed in the polybutadiene-styrene phase. After progressively more polystyrene is formed, there is a phase inversion period and styrene-polystyrene eventually becomes the continuous phase, with polybutadiene dispersed therein, as explained by Freeguard, *Br. Polym. J.*, vol. 6, page 205, 1974.

Whereas various rubbers, such as polybutadiene, have been used to modify polystyrene to improve the strength of polystyrene, polyphenylene oxide has been used to raise the softening point of polystyrene.

Polyphenylene oxide and the like are sometimes referred to as polyphenylene ethers, abbreviated as PPE, and are described in numerous publications, including an article by D. M. White titled "Poly(phenylene oxide)s" at chapter 28, pages 473–481 of *Comprehensive Polymer Science*, vol. 5, Pergamon Press, 1989, and including U.S. Pat. Nos. 3,306,874; 3,306,875; 3,257,357 and 3,257,358. PPE can be made to grades of sufficiently high molecular weights. Furthermore, high temperatures are necessary for processing PPE resins because of a high softening point in a range of about 210° C. to 280° C.

The incorporation of PPE in polystyrene is typically done by blending, such as blending PPE with polystyrene in an extruder at high temperatures to form PPE and polystyrene blends. For instance, European Patent 121,974 to Van der Meer et al. discloses in Example II the blending of PPE with polystyrene (PS) by heating blends of PPE with PS followed by extrusion. The PS used included rubber-modified polystyrene, and/or styrene-butadiene block copolymer (unsaturated), and/or styrene-butadiene block copolymer (saturated), and various additives. European Patent 168,566 and U.S. Pat. No. 4,423,189 also disclose blends of PPE and PS.

U.S. Pat. No. 3,664,977 to Nakanishi et al. discloses a combination of PPE and HIPS where the PPE is added in situ, that is, during the polymerization reaction to form HIPS type polystyrene from styrene monomer and rubber, as opposed to blending PPE with preformed polystyrene in an extrusion operation.

According to the Nakanishi patent, the PPE is added after phase inversion, in particular, between the time immediately after phase inversion up to the time the total solids level reaches 40%, and preferably when the solids level is 15–35%. Also, the Nakanishi patent states at col. 2, line 38, that the PPE was added in the form of a styrene solution of PPE. Further, at col. 3, line 7, the Nakanishi patent states that, in their process, a considerable amount of PPE is incorporated into the rubber particle portion of the HIPS product.

U.S. Pat. No. 5,660,776 to Wooden et al. is another reference where PPE is added during the polymerization process in the form of a solution of PPE in styrene. The Wooden et al. patent is directed to so-called GPPS (general purpose polystyrene), or crystal polystyrene, as opposed to HIPS. In the Wooden et al. patent, the feed PPE for the process is a solution of PPE in styrene. The solution is obtained by dissolving PPE in styrene. Thus, Wooden states that he provides a process to produce a solution of a styrenic polymer containing up to 15 weight % of polyphenylene ether comprising:

(a) dissolving a polyphenylene ether polymer in one or more of the monomers for said styrene polymer;

(b) feeding the solution obtained in (a) above together with up to 0.05 weight % of one or more organic free radical initiators and from 0 to 10 weight % of an organic diluent and additional monomer to produce a concentration of polyphenylene ether in monomer of up to 15 weight % to one or more reactors;

(c) subjecting said solution to heat for a time sufficient to polymerize at least 70 weight % of the monomers;

(d) subjecting said polymerized solution of styrenic polymer containing polyphenylene ether to temperature and pressure conditions to devolatilize unpolymerized monomer and diluent; and (e) extruding said solution of styrenic polymer containing polyphenylene ether as strands and cooling said strands and chopping said strands into pellets.

In referring to the Nakanishi patent, Wooden states that the Nakanishi U.S. Pat. No. 3,664,977 reference teaches blending polyphenylene ether into the bulk polymerization of high impact polystyrene (HIPS) between a point after rubber phase inversion (e.g., after the point when the phase volume of rubber in styrene is about equal to the phase volume of polystyrene in styrene) to a point when the total polymer concentration has become 40%.

SUMMARY OF THE INVENTION

According to the present invention, a process is provided for preparing polystyrene containing polyphenylene ether (PPE), which comprises:

(a) polymerizing styrene in the presence of a rubber to a point past phase inversion, preferably far beyond the phase inversion point, in a first reaction zone to obtain a first reaction mix;

(b) passing the first reaction mix to a second reaction zone wherein the polymerization of styrene is continued;

(c) adding a slurry of PPE in styrene, containing at least 15 wt. % PPE, to the first reaction mix in the second reaction zone; and (d) further polymerizing styrene in the slurry of PPE in styrene with the first reaction mix in the second reaction zone.

In a broad embodiment of the present invention, the slurry contains at least 15 wt. % PPE. However, preferably, the slurry contains at least 20 wt. % PPE, and more preferably at least 22 wt. % PPE, and most preferably at least 25 wt. % PPE. Preferably, the upper range of PPE in the slurry is below 50 wt. %, more preferably below 40 wt. %.

In the present invention, the slurry of PPE in styrene is added to the process in situ, that is, during the course of styrene polymerization rather than adding PPE by blending. Adding PPE by blending as part of the extrusion step is the prevalent method of adding PPE in accordance with the prior art. In the present invention, the PPE is introduced in situ, and beyond phase inversion point. The slurry of PPE in styrene preferably is introduced to the process of the present invention after the total polymer solids level in the reaction mixture is advanced to greater than 25 wt. %, more preferably greater than 30%, and most preferably greater than 40%. The total polymer solids include polystyrene and rubber.

The first reaction zone in the present invention may comprise one or more reactors, and the second reaction zone may comprise one or more reactors. The reactors preferably are CSTR (continuous-flow stirred-tank reactors) type reactors. However, many other types of reactors can be employed in the present invention, such as plug-flow reactors, tubular reactors or any modified reactors such as these types. Preferably, a four-reactor system is employed in the process of the present invention. In this four-reactor system, preferably the first and second reactors are used to progress the styrene monomer polymerization to a point where the total polymer solids level is greater than 40% of the total reaction mixture by weight, and the slurry of PPE in styrene is not added to the process until the third reactor. Preferably, the fourth reactor is used for final polymerization conversion as well as for the fine-tuning of product properties. Thus, according to a preferred embodiment of the present invention, a process is provided for preparing polystyrene containing polyphenylene ether (PPE) which comprises:

(a) polymerizing styrene in the presence of a rubber to a point just before phase inversion in a first reactor to obtain a first reaction mixture;

(b) passing the first reaction mixture to a second reactor and continuing styrene polymerization therein to a point where the total polymer solids level is greater than 40% of the total reaction mixture by weight and wherein the rubber phase is a dispersed phase as rubber particles and thereby obtaining a second reaction mixture;

(c) passing the second reaction mixture to a third reactor wherein the polymerization of styrene is continued;

(d) dispersing PPE in styrene to form a PPE-styrene slurry containing at least 15 wt % of PPE;

(e) adding the PPE slurry to the third reactor and reacting styrene monomer to polystyrene in the presence of PPE therein to obtain a third reaction mixture; and (f) passing the third reaction mixture to a fourth reactor and therein substantially completing the polymerization reaction.

Among other factors, the present invention is based on our unexpected finding that using a slurry of PPE in styrene and adding the slurry in situ after phase inversion, preferably far beyond the phase inversion point, achieves homogeneity of the matrix rigid phase (e.g., the complete mixing between PPE and polystyrene). The surprising homogeneity achieved is indicated by DSC (Differential Scanning Calorimeter) analysis, which shows a single Tg (glass-transition temperature). Also surprisingly, high impact strength has been obtained while increasing the heat deflection temperature using PPE slurry. We have found that the product PPE-rubber modified polystyrene from the process of the present invention has unexpectedly high impact strength at low temperature, such as 0° F. (−17.8° C.), with surprisingly little decrease in impact strength between 70° F. (21.1° C.) and 0° F. Furthermore, we have found that the process of the present invention minimizes the formation of undesired oligomers and the formation of lower molecular weight segments. Our results have unexpectedly shown noticeably increased tensile strength combined with increased tensile elongation when PPE slurry was added into the reaction mixture where the total solids (polystyrene and rubber) level was well beyond phase inversion, preferably 40% by weight or higher. The improved tensile properties were not achieved when PPE slurry was added to a point closer to phase inversion, such as before 40% solids level. Accordingly, in the process of the present invention, it is especially advantageous to add the slurry of PPE in styrene after the total solids level in the polymerizing mixture exceeds 25%, preferably exceeds 30%, and most preferably exceeds 40 wt. %. Further, we have found that the process of the present invention is most advantageously carried out using four reactors in series.

DETAILED DESCRIPTION OF THE INVENTION

Figure 1:
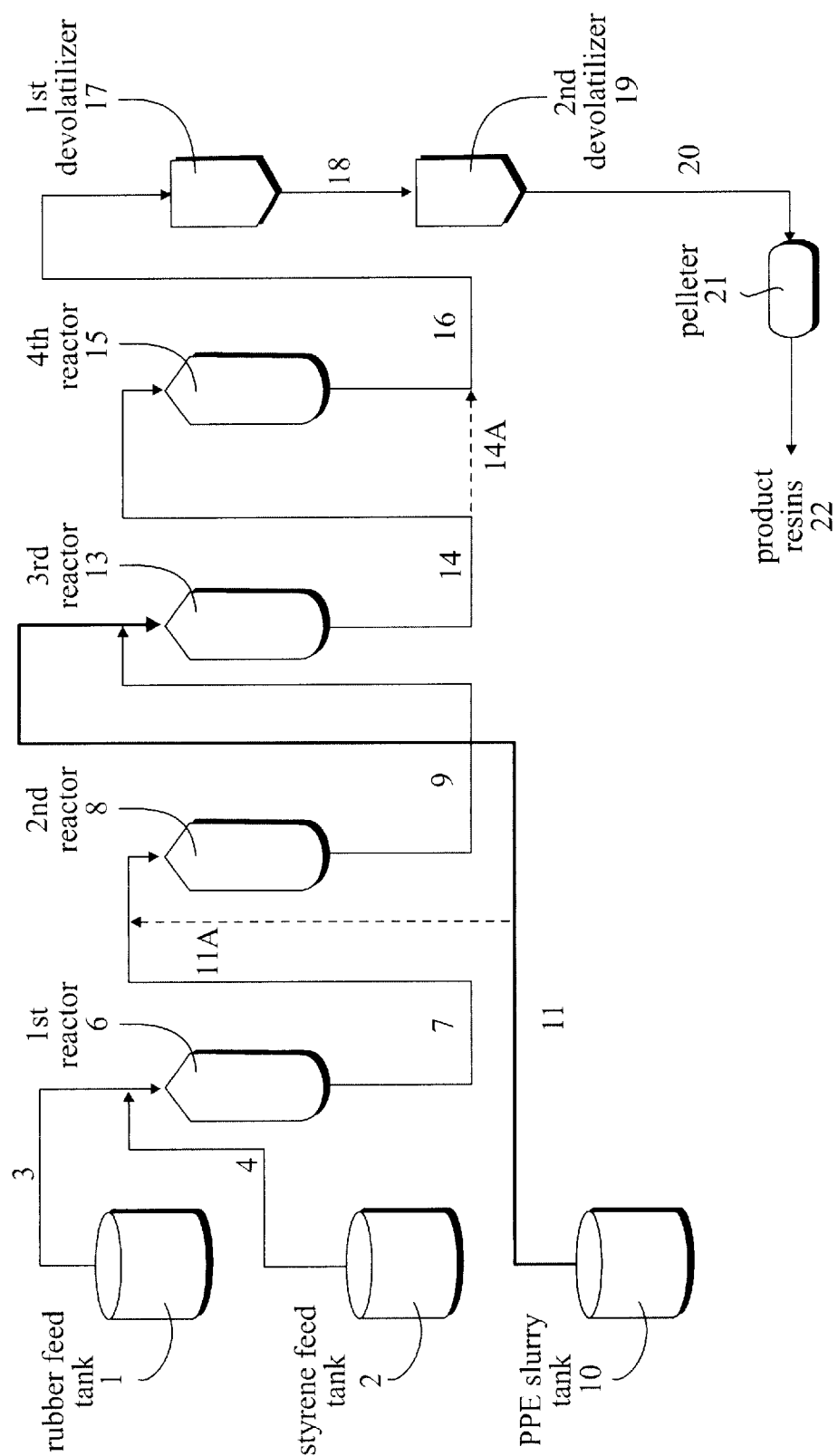
FIG. 1 is a simplified process flow diagram which schematically illustrates the flow sequence in accordance with a preferred embodiment of the present invention.

Referring to the preferred embodiment of FIG. 1 in more detail, rubber mixture from the rubber feed tank 1 and styrene monomer from the styrene feed tank 2 are pumped via lines 3 and 4, respectively, to the first reactor 6. The styrene monomer and the rubber streams are combined just prior to entering the first reactor as shown, or these streams may be combined in the reactor.

The partially polymerized polystyrene/styrene/rubber mixture flows from the first reactor 6 to the second reactor 8 via line 7. Further polymerization occurs in the second reactor, taking the reaction far beyond phase inversion point. The post-phase inversion reaction product from the second reactor flows via line 9 to the third reactor 13.

A PPE slurry (containing PPE and more styrene monomer) from the PPE slurry tank 10 flows via line 11 and is combined with the post-phase inversion reaction product in line 9 before entering the third reactor 13. Polymerization proceeds further toward completion in the third reactor 13.

The effluent from the third reactor flows via line 14 to the fourth reactor 15. The polymerization proceeds further toward completion in the fourth reactor, as is described in more detail hereinbelow. The effluent from the fourth reactor is passed via line 16 to the first devolatilizer 17.

In the devolatilizing step, volatile components such as unreacted monomers and diluents are removed from the polymer product. The effluent from the first devolatilizer flows via line 18 to an optional second devolatilizer 19 to remove residual volatiles from the polymer product.

The devolatilized polymer product then flows via line 20 to the pelleter 21 (or pelletizer 21) which forms the polymer into uniform pellets. The pellets from the pelleter are then in a form ready to be used as product resins 22 and are sent to product resin storage (not shown).

The FIG. 1 embodiment of the present invention is an embodiment wherein four reactors are used in series for a continuous bulk polymerization process in accordance with the present invention. Preferably, the reactors used in the present invention are continuous-flow stirred-tank reactors (CSTR). Mixing in the CSTRs preferably is by a specially designed rotary agitator. All CSTRs preferably have a heating/cooling medium in reactor jackets. Furthermore, preferably, the vapor space of all CSTRs is a nitrogen atmosphere of a specified pressure for temperature control/adjustment. Additives are added as desired either to the feedstream or directly to any one of the CSTRs.

A rubber-styrene solution and a styrene stream are continuously charged into a first CSTR, identified as vessel 6 in FIG. 1, and the reactor contents are agitated or mixed in the reactor. Polymerization is preferably chemically initiated at a temperature below the thermal initiation temperature of styrene polymerization. In the present invention, it is preferred not to have thermal initiation in the first-stage reactor. The initiator used in the present invention is selected to enhance the grafting of styrene on to the rubber. Residence time of the reaction mixture is adjusted so that rubber is grafted with polystyrene. Ungrafted polystyrene formed is only a dispersed phase of many small polystyrene/styrene domains. That is, at the exit point of CSTR 6, styrene conversion is at a relatively low level, usually at about 5 to 8 wt. %, of all monomer styrene charged in the first CSTR.

The reaction mixture from the first CSTR is continuously passed via line 7 to a second CSTR identified as 8 in FIG. 1. In this preferred embodiment, further polymerization is thermally initiated at a temperature greater than the minimum thermal initiation temperature. Optionally, a chain transfer agent (CTA) and/or organic peroxides can be employed to vary the properties of the product resin. Residence time in the second CSTR is preferably sufficient to ensure substantially complete rubber phase inversion. The total solids (polymer) level at the exit of the second CSTR, reactor 8 in FIG. 1, is about 25 to 45 wt. %, depending on specified product requirements. Optionally, but not preferred, slurry PPE in styrene can be introduced to the second reactor via line 11A.

The reaction mixture from the second CSTR, reactor 8, preferably is continuously passed via line 9 to a third CSTR, reactor 13, to which a stream of PPE slurry is also continuously introduced via line 11. In this preferred embodiment of the invention, polymerization is continued in reactor 13 by a combination of chemical and thermal initiation or by thermal initiation only, but at a temperature much higher than the minimum thermal initiation temperature, thereby achieving high conversion of monomer styrene to polystyrene. Preferably, a fourth CSTR, reactor 15, is used to reach still higher conversion of styrene monomer and achieve added flexibility in the process of the present invention. Benefits of using a fourth CSTR in the present invention include monomer conversion to a high level, adjustability of molecular weight distribution, and product property flexibility.

With or without a fourth CSTR, reaction mixture from either the third CSTR or the fourth CSTR is preferably continuously passed via line 16, or lines 14A and 16, to a devolitalization zone. Preferably, two flash devolitalization vessels are connected in sequence, as indicated by vessels 17 and 19, and used for removal of monomers and liquids of low boiling points ("volatiles") using high vacuum. The hot polymer melt is continuously pumped out via line 20 from the devolitalization zone, to form product 22 via pelleter 21.

Although the polymerization of styrene may proceed by thermal initiation in the stirred tank reactors, chemical initiation along with thermal initiation can be applied to the polymerization of styrene in the presence of PPE. Two types of free radical initiators may be employed in the present invention.

The first and the preferred type is organic peroxides, which contains classes as peroxydicarbonates, peroxyesters, diacyl peroxides, monoperoxycarbonates, peroxyketals, dialky peroxides, hydrogen peroxides. Examples are di-sec-butyl peroxydicarbonate, di-(2-phenoxyethyl) peroxydicarbonate, alpha-cumyl peroxyneodecanoate, t-amyl peroxyneodecanoate, t-butyl peroxypivalate, t-butyl peroxypivalate, 3-hydroxy-1,1-dimethylbutyl peroxy-2-ethylhexanoate, 2,5-dimethyl-2,5-di-(2-ethylhexanoylperoxy)hexane, t-amyl peroxy-2-ethylhexanoate, t-butyl peroxy-2-ethylhexanoate, t-butyl peroxyisobutyrate, t-butyl peroxy-(cis-3-carboxy)propenoate, 2,5-dimethyl-2,5-di(benzoylperoxy)hexane, t-amyl peroxyacetate, t-amyl peroxybenzoate, t-butyl peroxyacetate, t-butyl peroxybenzoate, di-t-butyl diperoxyphthalate, diisononanoyl peroxide, didodecanoyl peroxide, succinic acid peroxide, dibenzoyl peroxide, oo-t-amyl o-(2-ethylhexyl) monoperoxycarbonate, oo-t-butyl o-isopropyl) monoperoxycarbonate, oo-t-butyl o-(2-ethylhexyl) monoperoxycarbonate, 1,1-di-(t-amylperoxy) cyclohexane, 1,1-di-(t-butylperoxy)cyclohexane, 2,2-di-(t-butylperoxy)butane, ethyl 3,3-di-(t-amylperoxy)butyrate, di-alpha-cumyl peroxide, di-t-butyl peroxide, hydrogen peroxide, and the like.

The second type is the azo free radical initiators which are symmetrical and unsymmetrical azonitriles. A common example is 2,2'-Azobisisobutyronitrile (AIBN) and the like.

The polyphenylene ether polymers suitable for the present bulk process include those having repeating structural units of a divalent phenolic radical as represented below.

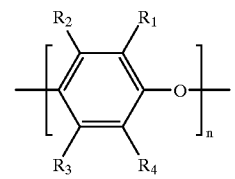

Wherein $R_1$, $R_2$, $R_3$ and $R_4$ can be hydrogen atom, halogen atom, one to four alkyl radicals, one to four alkoxy radicals, substituted or non-substituted aromatic radicals. Examples are poly(2,6-dimethyl-1,4-phenylene oxide), poly(2,6-diethyl-1,4-phenylene oxide), poly(2,6-diphenyl-1,4-phenylene oxide), poly(2,6-dipropyl-1,4-phenylene oxide), poly(2,6-dimethoxy-1,4-phenylene oxide), poly(2,6-dichloromethyl-1,4-phenylene oxide), poly(2,6-dibromomethyl-1,4-phenylene oxide), poly(2,6-ditolyl-1,4-phenylene oxide), poly(2-chloro-6-methyl-1,4-phenylene oxide), poly(2-bromo-6-methyl-1,4-phenylene oxide), poly(2,6-dichloro-1,4-phenylene oxide), poly(2,6-dibromo-1,4-phenylene oxide), poly(2,5-dimethyl-1,4-phenylene oxide), poly(2-ethyl-6-methyl-1,4-phenylene oxide), poly(2-isopropyl-6-methyl-1,4-phenylene oxide), poly(2-ethyl-6-methyl-1,4-phenylene oxide), poly(2-ethyl-6-phenyl-1,4-phenylene oxide), and poly(2,6-dichloromethoxy-1,4-phenylene oxide).

In addition to styrene, other vinylidene aromatic monomers are also suitable. Examples are alpha-alkyl monovinyl monoaromatic monomers, such as alpha-methylstyrene, alpha-ethylstyrene, alpha-ethylvinyltoluene, ring-substituted alkyl styrene, ring-substituted halostyrene, ring-alkyl, ring-halo-substituted styrene, etc.

The rubber used in the present bulk process preferably is a synthetic diene polymer or diene block copolymer which can be dissolved in the styrene monomer. Butadiene polymers and the mixture of butadiene polymers are commonly used, including rubbery diene polymers, having a second order transition temperature not higher than 0° C., preferably not higher than −20° C., and one or more of the conjugated, 1,3-diene, such as butadiene, isoprene, 2-chloro-1,3-butadiene, 1-chloro-1,3-butadiene, piperylene, etc. The diene block copolymers are those copolymers of conjugated 1,3-diene with up to any equal amount by weight of one or more copolymerizable monoethylenically unsaturated monomers, such as monovinylidene aromatic monomers (that is, styrene, an alkylstyrene), arylhalo monovinylidene aromatic monomers, acrylonitrile, methacrylonitrile, alkyl acrylates, the corresponding alkyl methacrylates, acrylamides, unsaturated ketones, alpha-olefins, vinyl esters, vinyl and vinylidene halides, and the like. In the present invention, the preferred rubber is a polybutadiene.

The rubber component adds to the strength of the product produced from the resins that are produced by the present invention. Different additives are also used to improve product performance and to serve various applications in terms of processability, weatherability, UV resistance, recyclability, chemical resistance, thermal stability, surface characteristics, and pigmentation.

In the process of the present invention, one of the most significant advantages of adding PPE as a PPE slurry (defined as PPE powder dispersed and suspended evenly within a liquid) of PPE in styrene or other suitable solvent or of a mixture of both, rather than as a PPE solution (a homogeneous and a one-phase liquid) of styrene, is the ability for high loading of PPE feed without risking styrene polymerization throughout feed storage time. Usually, at ambient temperatures, it takes many hours for styrene to dissolve PPE to obtain a homogeneous solution of PPE in styrene, even at levels of about 10 wt. % PPE. As a result, only low levels of PPE can be incorporated in product resins using typical prior art solutions of PPE in styrene. High temperatures have to be applied for higher PPE loading styrene solutions. However, as indicated above, high temperatures promote styrene polymerization during PPE feed storage time, and impose a serious safety risk to a commercial scale production. In addition, having a solution of high concentration PPE imposes a plugging or clogging risk in transfer lines, such as when PPE gelation occurs due to a failure to maintain a high temperature in the transfer lines at all places at all times.

Preferably, according to the present invention, a PPE slurry in styrene is prepared at ambient temperature by simply and quickly dispersing PPE powders into styrene monomer under moderate agitation. Preferably, the PPE/styrene slurry is prepared at a temperature of 15° C. to 45° C., more preferably 15° C. to 35° C., and most preferably 20° C. to 30° C. Preferably, in the process of the present invention, agitation is used to help keep PPE powders evenly distributed as suspended particles in styrene. Some heat is generated because the slurry is under a constant and moderate agitation, so that slurry of PPE in styrene will incur some small temperature increase over the starting temperature of the styrene and PPE. Nevertheless, that increase in temperature, and the temperature level used for the slurry, according to the preferred embodiments of the present invention, is still far below the thermal initiation point for styrene polymerization. These features lead to achieving a high loading PPE/styrene feed and a high PPE level in the product resins of the present invention.

Another advantage of the present invention is flexibility of the process when the PPE is added in slurry form in accord with the invention. This results in more control of product properties and a broader range of product mix in terms of PPE levels. In the present invention, the PPE slurry can be charged in any CSTR, subject to the limitations previously stated. Preferably, four CSTRs are used in series, and preferably the PPE slurry is added to the third CSTR. Preferably, the total solids level is above 25 wt. % in the third CSTR, more preferably above 30 wt. %, and most preferably above 40 wt. %. Benefits of this preferred embodiment of the present invention include the following: First, rubber phase inversion and rubber particle sizing has greater integrity, the rubber particle is more "intact", and the process operation and product properties are more flexibly controlled as desired prior to the PPE introduction as well as for the final resin properties. Second, PPE is not part of the rubber particle occlusion and PPE is better utilized for matrix polystyrene modification, such as strength and softening point. Third, minimum effect on reducing molecular weights of polystyrene by PPE can be achieved in the process of the present invention, resulting in higher molecular weight polystyrene in the product.

EXAMPLES

The experiments shown below were carried out on a pilot scale facility having as many as four CSTR (Continuous-flow Stirred Tank Reactor) reactors in a series. Two flash vessels were located at the end of the pilot line. The PPE slurry was prepared by charging styrene and then charging PPE powder into a tank under agitation at room temperature. Samples were collected of the process for each set of experimental conditions reaching a steady state.

All mechanical properties of the resultant resins were tested on injection molded specimen according to ASTM methods, unless stated otherwise. The PPE weight % in the products was determined by elemental analysis. The glass transition temperature (Tg) of the products was measured on a TA DSC 2010 instrument (a differential scanning calorimeter manufactured by TA Instruments) under nitrogen, with a 10° C. temperature ramp per minute. The polymer softening temperature or Vicat is given in degrees Fahrenheit, and is measured according to ASTM D1525 rate b. MFR is the melt flow rate of the product resins measured at 200° C. under 5 kg weight load. HDT is the heat distortion temperature measured according to ASTM D6489 at 264 psi. HAZE is one of the measurements for polymer transparent property and is measured according to ASTM D1003. IZOD, notched, ¼", is the one of the impact tests for polymer toughness measures according ASTM D256 method A for notched specimen of either room or low temperatures. Instrumented impact is also an impact test for polymer toughness and is measured according to ASTM D3763. Tensile strength at yield (Ty) and at break (Tb) and tensile elongation (TE) at break are measured according to ASTM D638. Rubber weight percent is measured by pulse NMR.

Examples Nos. 1, 2, 3 and 4 illustrate a bulk process using a PPE/styrene monomer slurry feed in order to obtain polystyrene resins containing PPE. In each of these examples, three CSTR's are used in series. The PPE slurry of styrene is introduced to a first CSTR where polymerization of styrene is carried by chemical and thermal initiations. The chemical initiator used is an organic peroxide. Different temperatures are used in the second and third CSTR's for more polymerization of styrene monomer and for property control of the resulting resins.

Comparative Example A

Styrene monomer was fed to the first CSTR. The first CSTR was maintained at 125° C. The partially polymerized effluent from the first reactor is fed to the second CSTR which was maintained at 145° C. The effluent from the second reactor was fed to the third CSTR which was maintained at 165° C. The polymerized product was then devolatilized in two flash devolatilizers in series to remove any unreacted monomers, and other volatile components.

Example 1

A PPE/styrene monomer slurry containing 9.03 wt. % PPE was fed to the first CSTR. The first CSTR was maintained at 125° C. The partially polymerized effluent from the first reactor is fed to the second CSTR which was maintained at 145° C. The effluent from the second reactor was fed to the third CSTR which was maintained at 165° C. The polymerized product was then devolatilized in two flash devolatilizers in series to remove any unreacted monomers, or other volatile components.

Example 2

The procedure and apparatus used in Example 2 was the same as Example 1 except the PPE/styrene slurry was 8.47%.

Example 3

The procedure and apparatus used in Example 3 was the same as Example 1 except that the PPE/styrene monomer slurry was 15.73 wt. % and the third CSTR slurry was maintained at 145° C.

Example 4

The procedure and apparatus used in Example 3 was the same as Example 1 except that the PPE/styrene monomer slurry was 15.73 wt. %, the second CSTR slurry was maintained at 135° C. and the third CSTR slurry was also maintained at 135° C.

Table 1 gives the main reaction conditions for Comparative Example A and Examples Nos. 1, 2, 3 and 4. Polymer property testing results for the resins produced in Comparative Example A and Examples 1–4 are shown in Table 2. All resins obtained show a single Tg (glass transition temperature) on the DSC (Differential Scanning Calorimeter) data plots, and transparency (Haze data) as good as crystal polystyrene resins. It is surprising and unexpected that PPE slurry gives homogeneous products at a broad range of PPE loading in the slurry and for a broad range of PPE level in products. Furthermore, the heat resistance property of the products obtained are significantly improved while the products are still easy to process.

It is also found that when an additional CSTR is used at the end of the reaction stream, an increase in softening temperature (Vicat) can be achieved without a higher level PPE in the products, as seen for No. 4 example with respect to No. 3 example.

TABLE 1

Process conditions for styrene polymerization in the presence of PPE using a PPE slurry feed

| Example No. | Comparative A | 1 | 2 | 3 | 4 |
|---|---|---|---|---|---|
| Slurry PPE wt. % | 0 | 9.03 | 8.47 | 15.73 | 15.73 |
| Slurry PPE temp. ° C. | — | 25–38 | 25–38 | 25–38 | 25–38 |
| 1st CSTR temp. ° C. | 125 | 125 | 125 | 125 | 125 |
| 2nd CSTR temp. ° C. | 145 | 145 | 145 | 145 | 135 |
| 3rd CSTR temp. ° C. | 165 | 165 | 165 | 145 | 135 |

TABLE 2

Property data of products of styrene polymerization in presence of PPE using a PPE slurry feed

| Example No. | Comparative A | 1 | 2 | 3 | 4 |
|---|---|---|---|---|---|
| Product PPE wt. % | 0 | 9.05 | 13.24 | 17.99 | 14.33 |
| Tg ° C. | 100.5 | 104.2 | 108.7 | 114.6 | 114.1 |
| Vicat ° F. | 223 | 232 | 237 | 247 | 249 |
| MFR g/10 min. | 8.3 | 5.4 | 4.2 | 2.2 | 1.8 |
| HDT ° F., 264 psi | 191 | 198 | 203 | 208 | 213 |
| HAZE % | 1.2 | 2.9 | 3.0 | 1.1 | 1.0 |

Examples Nos. 5–9 illustrate a bulk process using PPE/styrene slurry as one feed and a syrup of polybutadiene in styrene as another feed to obtain polystyrene resins containing PPE and polybutadiene (PBD). In each of these examples, four CSTR's are used in series. Table 3 gives main process conditions for Examples Nos. 5, 6 and 7. Tables 5 and 6 show the differences in tensile properties and impact performance for Examples 5, 9, 10 and 11 to illustrate the importance of charge point of PPE slurry in the current invention.

Example 5

A PBD/styrene solution was introduced into the first CSTR for PBD grafting with polystyrene and, possibly, there was some rubber phase inversion occurring in this CSTR. An organic peroxide was used as an initiator in the first CSTR. The first reactor was maintained between 90 and 100° C. The partially polymerized PBD/styrene solution was next introduced to a second CSTR where either rubber phase inversion starts to take place or continues to take place. Polymerization of styrene was carried out by both chemical and thermal initiation. The chemical initiator used in the second CSTR was a different organic peroxide suitable for higher temperature initiation. The second CSTR reactor is maintained at 125° C. The post phase inversion PBD/styrene polymer solution from the second reactor was then fed to the third CSTR reactor. The PPE/styrene slurry was also fed into the second CSTR reactor. The third CSTR was maintained at 145° C. The effluent from the third reactor was then fed to the fourth CSTR which was maintained at 155° C. The resultant polymer from the fourth CSTR was then devolatilized in two flash devolatilizers in series to remove any unreacted monomers, or other volatile components.

Example 6

The procedure and apparatus used in Example 6 was the same as Example 5 except that the fourth CSTR was maintained at 145° C.

Example 7

The procedure and apparatus used in Example 7 was the same as Example 6 except the initiator level in the first CSTR is 25% higher than that of Example 6. As a result, rubber grafting is better and so is IZOD.

The resultant resin property test results are shown in Table 4. All resins obtained show a single Tg (glass transition temperature) on the DSC data plots for the matrix rigid phase (the phase outside PBD rubber particles). The PPE slurry addition gives not only a homogeneous matrix rigid phase under high PPE loading in the slurry but also good low temperature impact properties, both of which are unexpected when PBD is one of the components in the reaction mixture. For regular HIPS, in order to increase the softening point temperature, impact property has to be sacrificed. Examples Nos. 5, 6 and 7 show that not only is the heat resistance property dramatically increased but also the impact property increases. The ESCR (environmental stress cracking resistance) property is usually very poor for regular HIPS. Our test results for these examples indicted a "non-break" situation for these products in days. This means that the resins will provide greater ability for load-bearing applications under an aggressive environment.

Comparative Example B

Comparative Example B was a styrene/PBD polymer resin, a general purpose HIPS resin, that did not contain any PPE. This control resin was made in a process similar to the process described in Example 5 except that there is no PPE slurry addition and temperatures of the CSTR's are different.

TABLE 3

Process conditions for styrene polymerization in presence of PPE using a PPE slurry feed, and in the presence of butadiene rubber

| Example No. | Comparative B | 6 | 7 | 8 |
|---|---|---|---|---|
| Slurry PPE wt. % | 0 | 21.63 | 21.63 | 21.63 |
| Slurry PPE temp.° C. | — | 25–38 | 25–38 | 25–38 |
| 1st CSTR temp.° C. | 119 | 95 | 95 | 95 |
| 2nd CSTR temp.° C. | 139 | 125 | 125 | 125 |
| 3rd CSTR temp.° C. | 166 | 145 | 145 | 145 |
| 4th CSTR temp.° C. | 166 | 155 | 145 | 145 |

TABLE 4

Property data of products of styrene polymerization in presence of PPE using a PPE slurry feed and in the presence of butadiene rubber

| Example No. | Comparative B | 5 | 6 | 7 |
|---|---|---|---|---|
| Product PPE wt. % | 0 | 14.90 | 15.92 | 14.86 |
| Tg ° C. | 100 | 109.2 | 113.1 | 112.9 |
| Vicat ° F. | 215 | 235 | 244 | 241 |
| MFR g/10 min. | 3.2 | 1.6 | 0.9 | 1.0 |
| HDT ° F., 264 psi | 187 | 200 | 203 | 200 |
| IZOD, R. T. ft. lb/in | 1.70 | 1.78 | 1.52 | 1.86 |
| IZOD, 0° F. ft. lb/in | N.A. | N.A. | 1.20 | N.A. |
| Instrumental Impact R.T. total energy ft-lb | | 20.14 | 14.34 | 22.08 |
| Instrumental Impact 0° F. total energy ft-lb | | | | 16.76 |
| Ty psi | 3200 | 556 | 5803 | 5858 |
| Tb psi | 2800 | 4523 | 5408 | 5233 |
| TE at break % | 65 | 32 | 42 | 51 |

N.A.: Not available because no measurement was carried out.

Example 9

A PBD/styrene solution was introduced into the first CSTR for PBD grafting with polystyrene. An organic peroxide is used as an initiator in the first CSTR. The first reactor is maintained at 95° C. The partially polymerized PBD/styrene solution was next introduced to a second CSTR where either rubber phase inversion starts to take place. Polymerization of styrene in the second CSTR was carried out by thermal initiation. The second CSTR reactor is maintained at 135° C. The post phase inversion PBD/styrene polymer solution from the second reactor was then fed to the third CSTR reactor. The PPE/styrene slurry was fed into the third CSTR reactor too. The third CSTR was maintained at 145° C. The effluent from the third reactor was then fed to the fourth CSTR which was maintained at 145° C. The resultant polymer from the fourth CSTR was then devolatilized in two flash devolatilizers in series to remove any unreacted monomers, or other volatile components.

TABLE 5

Tensile property for polystyrene containing PPE that is introduced to the 2nd reactor (rubber phase inversion reactor) or to the 3rd reactor (far beyond rubber phase inversion)

| Example No. | 5 | 9 |
|---|---|---|
| Vicat ° F. | 235 | 239 |
| IZOD, R. T. ft. lb/in | 1.78 | 1.74 |
| Ty psi | 5556 | 6175 |
| Tb psi | 4523 | 5206 |
| TE at break % | 32 | 43 |

Main difference in process conditions for Examples No. 5 and No. 9 is that the PPE/styrene slurry addition point. For Example No. 5, the PPE/styrene slurry was added in the second reactor where rubber phase inversion is just completed. For Example No. 9, the PPE/styrene slurry was added in the third reactor where the reaction mixture had total polymer solids greater than 40% of the total weight of the reaction mixture. In the third reactor, the reaction mixture is far beyond rubber phase inversion point. It can be seen that PPE/styrene slurry addition in the third reactor significantly increases tensile strength as well as tensile elongation. That is, resin of Example No. 9 is tougher than that of Example No. 5.

Examples Nos. 10 and 11 were carried out using a batch lab-scale reactor facility. The facility is a "LabMax" (trade name of Mettler-Toledo AG) automatic reactor system with computer programming and recording capacity.

Example 10

A solution of PPE in styrene and a solution of rubber in styrene were mixed in the lab-scale reactor under agitation at about 60° C. Toluene was used as a diluent. A mixture of two organic peroxides were added to the reaction mixture. Then, the reaction mixture is heated to 95° C. and maintaining at that temperature for about one and one-half hours. Then further increase the temperature to 125° C. and keep for about another one and one-half hours. The agitation was maintained throughout the reaction period. The resulting polymer melts were discharged from the reactor and remaining monomers and diluent were removed under vacuum and at high temperature. Finally, the resulting materials are ground and made into pellets for specimen molding.

Example 11

Example 11 follows the same procedure as Example 9, except that a PPE/styrene solution was not added at the beginning of the reaction but only after one and one-half hours after the rubber/styrene was reacted at 95° C. to pass phase inversion stage.

The mechanical properties or the resins produced were tested for polymer properties. The test results are shown in Table 5. These results indicate that surprisingly much better impact properties are achieved when PPE is added after rubber phase inversion.

TABLE 6

Impact property for polystyrene containing PPE that is introduced to the process at the beginning or after the rubber phase inversion

| Example No. | 10 | 11 |
|---|---|---|
| Vicat ° F. | 252 | 251 |
| IZOD, R. T. ft. lb/in | 3.3 | 5.9 |
| Ty psi | 4188 | 6298 |
| Tb psi | 4021 | 5433 |
| PBD wt. % | 13.9 | 13.2 |

What is claimed is:

1. A process for preparing polystyrene containing polyphenylene ether (PPE), which comprises:
   (a) polymerizing styrene in the presence of a rubber to a point past phase inversion in a first reaction zone to obtain a first reaction mix;
   (b) passing the first reaction mix to a second reaction zone wherein the polymerization of styrene is continued;
   (c) adding a slurry of PPE in styrene, containing at least 15 wt. % PPE, to the first reaction mix in the second reaction zone; and
   (d) further polymerizing styrene in the slurry of PPE in styrene with the first reaction mix in the second reaction zone.

2. A process in accordance with claim 1 wherein the styrene conversion is progressed to greater than 25% polymer solids by weight in the reaction mixture prior to adding the slurry of PPE in styrene.

3. A process in accordance with claim 1 wherein the slurry of PPE in styrene, added per step (c), contains at least 20 wt. % PPE.

4. A process in accordance with claim 1 wherein the slurry of PPE in styrene, added per step (c), contains at least 25 wt. % PPE.

5. A process in accordance with claim 1 wherein the styrene conversion is progressed to greater than 30% polymer solids in the reaction mixture prior to adding the slurry of PPE in styrene.

6. A process in accordance with claim 1 wherein the styrene conversion is progressed to greater than 40% polymer solids in the reaction mixture prior to adding the slurry of PPE in styrene.

7. A process in accordance with claim 1 wherein the first reaction zone comprises a first and second reactor in series, the second reaction zone comprises a third and fourth reactor in series, and the slurry of PPE in styrene is not added to the process until the third reactor.

8. A process in accordance with claim 7 wherein the fourth reactor is used to achieve fine control of the rubber and PPE modified polystyrene resin properties.

9. A process in accordance with claim 1 wherein the rubber is polybutadiene or butadiene block copolymers with styrene or a combination of the two.

* * * * *